United States Patent [19]

Thompson

[11] 4,377,178
[45] Mar. 22, 1983

[54] ANTI THEFT VALVE LOCKING DEVICE

[76] Inventor: Harold Thompson, 379 Demorest Ave., Staten Island, N.Y. 10314

[21] Appl. No.: 348,216

[22] Filed: Feb. 12, 1982

Related U.S. Application Data

[63] Continuation-in-part of Ser. No. 158,895, Jun. 12, 1980, abandoned.

[51] Int. Cl.³ .............................................. F16K 35/00
[52] U.S. Cl. ........................................ 137/385; 70/177
[58] Field of Search ..................... 137/382, 382.5, 383, 137/385; 70/175–179

[56] References Cited

U.S. PATENT DOCUMENTS

| 1,104,022 | 7/1914 | Tuttle | 137/385 |
| 1,275,135 | 8/1918 | Cunningham | 137/385 |
| 2,092,572 | 9/1937 | Deane | 137/383 |
| 2,309,304 | 1/1943 | Creighton | 137/385 |
| 3,406,708 | 10/1968 | Maydoch | 137/382 |

Primary Examiner—Alan Cohan
Assistant Examiner—John A. Rivell
Attorney, Agent, or Firm—Richard L. Miller

[57] ABSTRACT

An anti theft locking device is provided and consists of a casing having a longitudinal passage therethrough and a transverse tapered bore intersecting the passage, tapered plug having an aperture with a top square head portion on the larger end of the plug, the plug fitted for rotation in the tapered bore to control the passage and a locking cover for preventing rotation of the top square head portion of the plug.

1 Claim, 3 Drawing Figures

ANTI THEFT VALVE LOCKING DEVICE

This application is a continuation-in-part application of my co-pending application Ser. No: 6/158,895, filed on: 6-12-80, which is to be expressly abandoned upon the filing of this application.

BACKGROUND OF THE INVENTION

The instant invention relates generally to locking mechanisms and more specifically it relates to an anti theft locking device to prevent the unauthorized pilferage of any commodity such as, but not limited to, gas or water carried in pipes or conduits through a valve.

It is a known fact that present locking devices in use today do not utilize a simple, fail safe locking design which can provide a cost effective means to prevent the theft of utilities and other substances such a gas or water. Other locking devices are drilled into the on-off cock in the valve which can result in distortion if forced.

This situation is therefore in need of an improvement.

SUMMARY OF THE INVENTION

A principle object of the present invention is to provide an anti theft locking device that will effectively prevent the unauthorized tampering of a valve.

Another object is to provide an anti theft locking device that incorporates a standard valve in conjunction with the locking device.

A further object is to provide an anti theft locking device that is economical in cost to manufacture.

A still further object is to provide an anti theft locking device that is easy to use when placed within a pipe or conduit system.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawing are briefly described as follows.

DESCRIPTION OF THE PREFERRED EMBODIMENT

Figure 1:
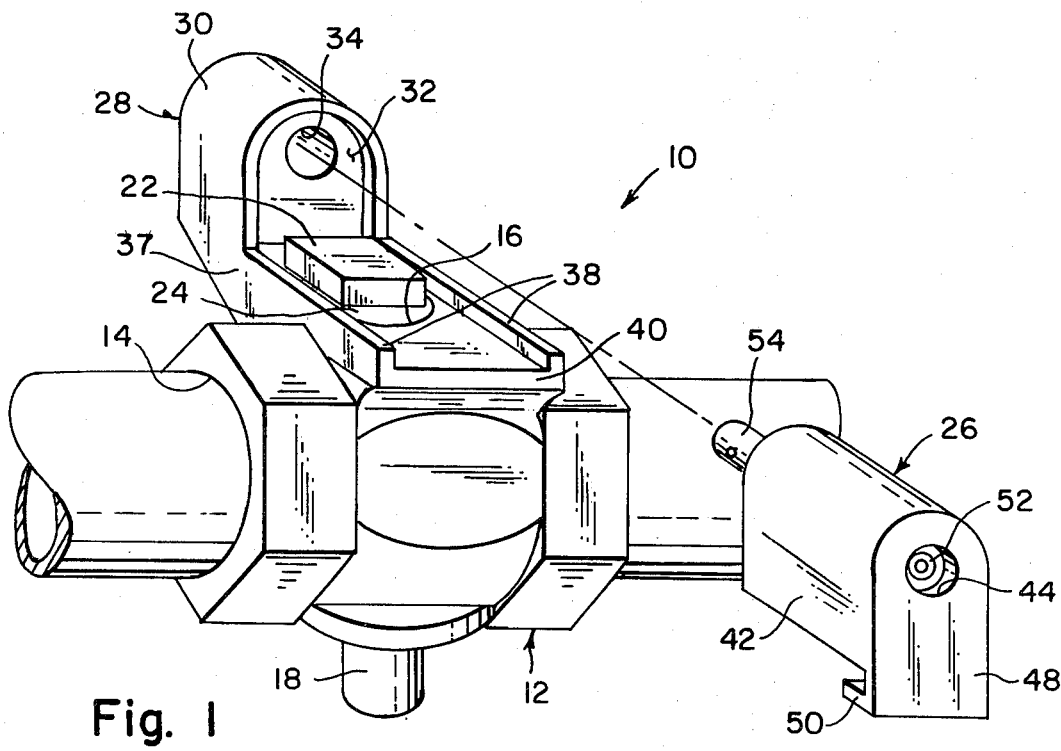
FIG. 1 is a perspective view of the invention.
Figure 3:
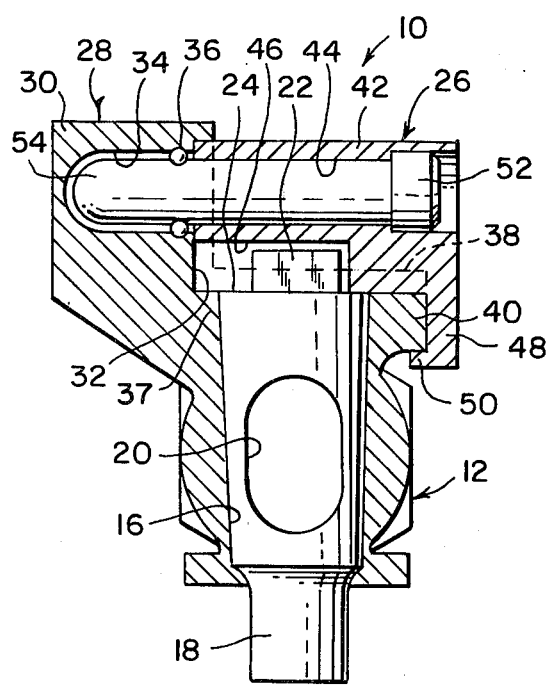
FIG. 3 is a cross sectional view taken on line 3—3 in FIG. 2.
Figure 2:
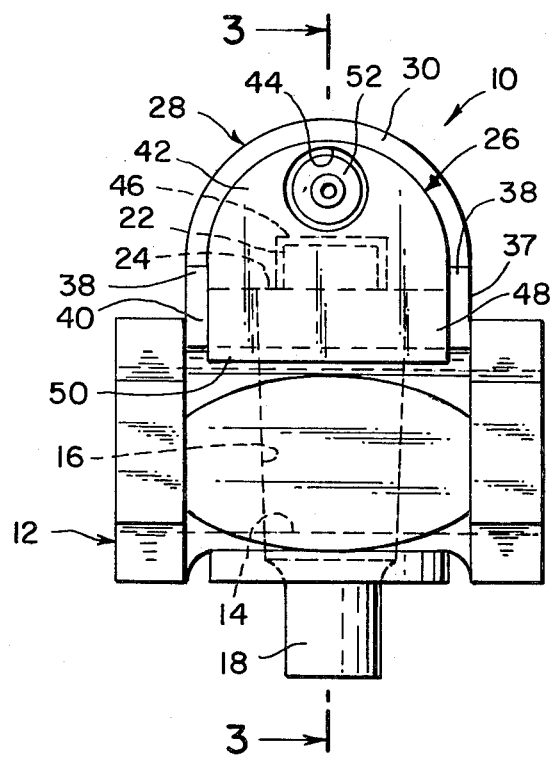
FIG. 2 is a front view of the invention.

Turning now descriptively to the drawings, in which similar reference characters denote similar elements throughout the several views, FIGS. 1 through 3 illustrates an anti theft locking device 10. A casing 12 is provided and has a longitudinal passage 14 to carry gas or water through pipes or conduits. A transverse tapered bore 16 intersects the passage 14. As best shown in FIG. 3, a tapered plug 18 has an aperture 20. A top square head portion 22 is located on the larger end 24 of the plug 18. The plug 18 is fitted for rotation in the tapered bore 16 to control the passage 14. It should be noted that the nut and the threaded end of the plug 18 is left out of the drawing in order to provide an uncluttered view. A locking cover 26 for preventing rotation of the top square head portion 22 of the plug 18 is shown and will be discussed later in greater detail.

The casing 12 further contains an L-shaped top portion 28 which comprises a vertical locking member 30 with a recessed wall 32 having a horizontal aperture 34 and a groove 36 within. The L-shaped top portion 28 also contains a horizontal channel member 37 having the transverse tapered bore 16 exiting therethrough between a pair of guide rails 38 and a free end 40 thereof.

The locking cover 26 consists of a housing 42 having a horizontal aperture 44 therethrough, a rectangular slot 46 in the bottom of the housing 42 and a vertical arm 48 having a rearwardly turned lip 50. A ball barrel key activated lock 52 is forced fit into the horizontal aperture 44 of the housing 42 with the locking end 54 extending rearwardly.

The housing 42 slideably contacts the horizontal channel member 37 butting against the recessed wall 32 of the vertical locking member 30 with the rearwardly turned lip 50 engaging the free end 40 of the horizontal channel member 37. The rectangular slot 46 of the housing 42 captures the top square head portion 22 of the plug 18 preventing rotation. The locking end 54 of the ball barrel key activated lock 52 will enter the horizontal aperture 34 and groove 36 locking the housing 42 to the L-shaped top portion 28 of the casing 12.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

What is claimed is:

1. An anti theft locking device which comprises:
   a casing having a longitudinal passage therethrough and a transverse tapered bore intersecting said passage;
   a tapered plug having an aperture with a top square head portion on larger end of said plug, said plug fitted for rotation in said tapered bore to control said passage;
   means for preventing rotation of said top square head portion of said plug, wherein said casing further contains an L-shaped top portion which comprises;
   a vertical locking member with a recessed wall having a horizontal aperture and a groove within;
   a horizontal channel member having said transverse tapered bore exiting therethrough between a pair of guide rails and a free end thereof, wherein said means for preventing rotation of said top square head portion of said plug is a locking cover which further comprises:
   a housing having a horizontal aperture therethrough, a rectangular slot in the bottom of said housing and a vertical arm having a rearwardly turned lip; and
   a ball barrel key activated lock forced fit into said horizontal aperture of said housing with locking end extending rearwardly so that when said housing slidably contacts said horizontal channel member butting against said recessed wall of said vertical locking member with said rearwardly turned lip engaging said free end of said horizontal channel member and said rectangular slot of said housing capturing said top square head portion of said plug preventing rotation, said locking end of said barrel key activated lock will enter said horizontal aperture and groove, locking said housing to said L-shaped top portion of said casing.

* * * * *